United States Patent
Lavrovsky et al.

(10) Patent No.: US 12,098,983 B2
(45) Date of Patent: Sep. 24, 2024

(54) DUCT MOUNTED AIR QUALITY MONITORING SYSTEM, METHOD AND DEVICE

(71) Applicant: Clad Innovations Ltd., Vancouver (CA)

(72) Inventors: Vladislav Igorevich Lavrovsky, Vancouver (CA); Kevin Hart, Port Coquitlam (CA); Aaron Joseph MacDonald, Garibaldi Highlands (CA)

(73) Assignee: Clad Innovations Ltd., Vancouver (CA)

( * ) Notice: Subject to any disclaimer, the term of this patent is extended or adjusted under 35 U.S.C. 154(b) by 708 days.

(21) Appl. No.: 16/479,147

(22) PCT Filed: Jan. 18, 2018

(86) PCT No.: PCT/CA2018/000011
§ 371 (c)(1),
(2) Date: Jul. 18, 2019

(87) PCT Pub. No.: WO2018/132892
PCT Pub. Date: Jul. 26, 2018

(65) Prior Publication Data
US 2019/0391052 A1 Dec. 26, 2019

Related U.S. Application Data

(60) Provisional application No. 62/447,450, filed on Jan. 18, 2017.

(51) Int. Cl.
*F24F 11/30* (2018.01)
*F24F 11/39* (2018.01)
(Continued)

(52) U.S. Cl.
CPC ............... *G01N 1/22* (2013.01); *F24F 11/39* (2018.01); *F24F 2110/50* (2018.01)

(58) Field of Classification Search
CPC .... F24F 11/0017; F24F 11/0086; F24F 11/30; F24F 11/39; F24F 2110/50; G01N 1/26;
(Continued)

(56) References Cited

U.S. PATENT DOCUMENTS 5,736,823 A * 4/1998 Nordby .................. F04D 27/00
388/930
8,657,936 B2 * 2/2014 Sullivan ................. B01D 46/18
96/417

(Continued)

FOREIGN PATENT DOCUMENTS

CN     106123160 A  * 11/2016  .......... F24F 11/0017
WO    2014144446 A1    9/2014

OTHER PUBLICATIONS

Machine English Translation of Chinese Patent CN 106123160 A (published on Nov. 16, 2016).*

(Continued)

*Primary Examiner* — Minh Chau T Pham (57) ABSTRACT

An air quality monitor apparatus for use in a ducted system. The apparatus comprising an enclosure having at least one air exchange port, at least one optical system and a plurality of sensors. The air exchange port creates an air stream pathway through the enclosure, while the optical system provides light across the air stream pathways. The plurality of sensors has access to the air stream pathway are configured to measure air quality data of the air stream. At least one microcontroller is configured to process the measured air quality data. At least one communication system is configured to communicate the processed air quality data with an outside network.

19 Claims, 5 Drawing Sheets

(51) Int. Cl.
*G01N 1/22* (2006.01)
*F24F 110/50* (2018.01)

(58) Field of Classification Search
CPC . G01N 15/06; G01N 15/0205; B01D 35/1435
USPC .................. 55/385.1, DIG. 34; 96/416–422
See application file for complete search history.

(56) References Cited

U.S. PATENT DOCUMENTS

| | | | |
|---|---|---|---|
| 10,222,360 B1* | 3/2019 | Nourbakhsh | G01N 33/0075 |
| 2004/0065204 A1* | 4/2004 | Dietrich | B60H 3/0085 |
| | | | 96/417 |
| 2007/0137318 A1* | 6/2007 | Desrochers | G01N 1/26 |
| | | | 73/863.81 |
| 2012/0222560 A1* | 9/2012 | Sullivan | B01D 46/521 |
| | | | 96/429 |
| 2014/0338528 A1* | 11/2014 | Hauville | B08B 15/00 |
| | | | 55/467 |
| 2015/0258488 A1* | 9/2015 | Meirav | F24F 7/065 |
| | | | 96/144 |
| 2016/0061476 A1 | 3/2016 | Schultz et al. | |
| 2017/0356670 A1* | 12/2017 | Zhang | F24F 11/74 |
| 2019/0346356 A1* | 11/2019 | Karnik | G01N 1/2273 |
| 2019/0360686 A1* | 11/2019 | Pendo | A61L 9/16 |
| 2020/0011779 A1* | 1/2020 | Lavrovsky | G01N 15/06 |
| 2021/0364184 A1* | 11/2021 | Savakkanavar | F24F 11/72 |
| 2021/0389290 A1* | 12/2021 | Zhang | G01N 33/0062 |
| 2021/0396639 A1* | 12/2021 | Meis | G01N 15/0211 |
| 2021/0405007 A1* | 12/2021 | Solomon | G01G 3/13 |

OTHER PUBLICATIONS

International Search Report and Written Opinion issued by the International Searching Authority in relation to International Application No. PCT/CA2017/000269 dated Apr. 16, 2018, 6 pgs.

\* cited by examiner

DUCT MOUNTED AIR QUALITY MONITORING SYSTEM, METHOD AND DEVICE

FIELD OF THE INVENTION

This disclosure relates generally to HVAC systems, and more particularly to systems and methods of quantifying and recording indoor air quality data in ducted systems.

BACKGROUND

Homeowners and facility managers typically rely on professional contractors or building engineers to perform spot checks on Heating Ventilation Air Conditioning ("HVAC") systems to determine if air displacement is sufficient throughout a house or other building; to quantify the levels of pollutants; or identify the origin of poor air quality. These spot checks are infrequent, costly and unreliable because they are completed by a series of labor intensive manual processes. This involves sampling the air with a variety of handheld devices including temperature/humidity meters, airflow meters, particulate meters and specialized devices called capture hoods that allow quantification of airflow volume out of a particular duct. Spot checks often fail to identify transient failures driven by system timing, diurnal atmospheric patterns or simply rare events. The sampling must be done in several locations, greatly increasing the time required to complete the tests. In large buildings, this kind of audit may only be done on an annual basis, which makes intervention into bad air quality possible only in extreme cases where it is clearly perceptible to the occupants.

SUMMARY

The present invention is for an air quality sensor monitor system and device that measures a plurality of air quality metrics in an integrated device that is driven by the forced air in any ducted system. The system has an air quality monitor (AQM) device which may be used for the quantification of one or more air quality parameters such as temperature, humidity, pressure, mass flow, air velocity, volatile organic carbon (VOCs), nitrous oxides (NOX), specific volatile gases (such as formaldehyde), oxygen (O2), carbon dioxide (CO2) particulate mass (PM2.5, PM10), particulate composition (type/diameter). The AQM contains a high resolution optical particle counter (OPC) with high spatial coherence and high signal bandwidth. The indoor air quality (IAQ) measuring AQM is a passive device in that it does not need moving parts such as a pump or fan, air is displaced via a plurality of low-impedance ports in the monitor. The monitor is installed in the ducts perpendicular to the axis of flow of the air, and is designed to reduce the induced turbulence in the air stream.

The device consists of a plurality of sensors, one or more microcontrollers, a power supply, optical systems and an enclosure. In some embodiments data and power are supplied over a wired connection. In other embodiments, the data connectivity is achieved through an onboard radio transceiver with integrated antenna or external antenna connected via coaxial cable. The device measures the displacement or mass flow of the air through it via optical, thermal or acoustic methods, thus allowing the calculation of the concentrations of any of the pollutants. The volumetrically compensated measurements allow the system to estimate the full pollution load instead of just making relative measurements. The user may input out-of-band data such as the dimensions of the duct in order for the device to be able to report back the total amount of each pollutant. Due to the good mixing present in most duct systems, this results in an accurate assessment despite only sampling a small cross-sectional area. The use of continuous sampling allows the device good statistical strength by trading sampling volume for longer sample times. The AQM is agnostic to the direction of flow due to the symmetry in the air exchange ports and the bidirectional nature of the flow sensing elements. The ports are symmetrical, have high internal surface finish quality and have the necessary geometry to ensure smooth laminar flow across the sensors at all operating velocities/displacements present in ducted systems. As a consequence, there is no change in data quality regardless of installation orientation. The AQM may thus be installed upside down, or on either side of the duct, with no loss of performance. The air stream pathways of the AQM may be straight or curved. In one embodiment, the pathways have a nozzle or narrowed midsection (example hourglass shape) in order to accelerate the airstream as it enters the port and traverses the device along the pathway. This also concentrates the aerosols suspended in the airstream as they pass through the device along the pathways. The higher airstream velocity prevents sedimentation of the suspended aerosols as the airstream passes the critical sensing regions. The increased concentration of the aerosols suspended in the airstream improve the detection efficiency of the optical particle counter. The nozzle ensures that the aerosols cross the region of greatest optical power density and produce the strongest response in the OPC detector.

In an embodiment, the device may have a mounting fixture that enables the rapid installation (insertion and removal) of the probe from the duct. It secures the device in place relative to the duct or other air handling conduit. The duct may be metal, plastic, duct board or other suitable material, or may be formed by other structural members such as walls or ceiling tiles. The duct cross-section may have a square, rectangular, circular, or oval shape and may be rigid or flexible. The mounting fixture ensures that the device may be securely mounted with all of the aforementioned types, shapes and materials of duct or air handling conduit. The mounting fixture has multiple interfaces ensuring that the gaskets form a contiguous mating surface on both flat and curved surfaces. This ensures that leakages are minimized and that installation of the device does not affect the efficiency of the HVAC system.

BRIEF DESCRIPTION OF THE DRAWINGS

The disclosure may be more completely understood in consideration of the following description of various illustrative embodiments in connection with the accompanying drawings, in which:

FIG. 3 is an exploded side view of the device of FIG. 1 according to some embodiments.

FIG. 4 is a cross sectional top view of the device of FIG. 1 according to some embodiments.

FIG. 5 is an exploded top perspective view of the device of FIG. 1 according to some embodiments.

FIG. 6 is an exploded bottom perspective view of the device of FIG. 1 according to some embodiments.

While the disclosure is amenable to various modifications and alternative forms, specifics thereof have been shown by way of example in the drawings and will be described in detail. It should be understood however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings in which similar elements in different drawings are numbered the same. The description and the drawings, which are not necessarily to scale, depict illustrative embodiments which are not intended to limit the scope of the disclosure. The embodiments depicted are intended to be illustrative in nature. Selected features of any illustrative embodiment may be incorporated into an additional embodiment unless clearly stated to the contrary.

The present invention is a device for an air quality monitor (AQM) that measures a plurality of air quality metrics in an integrated device that is driven by the forced air in any air handling conduit system, such as a ducted system.

The device may be installed in any duct to measure the indoor air quality of rooms or areas upstream of the installation location. Multiple such AQM devices can be deployed in an HVAC system at different nodes and branches of the supply or return air streams or both. In this way, the AQMs can identify the origin of pollution events and quantify the performance of air sanitizing equipment, including equipment integral to the HVAC system as well as standalone room filters. Cross referencing between two or more AQMs can show that pollution that is not ambient in the region has originated in the rooms or areas upstream of the installation location. In other situations, the device may be installed in the return air system proximal to the furnace or other air handling unit, before the air filter or other air sanitizing systems. Placement in the return air system, particularly in a plenum or other area where multiple airstreams converge into a larger duct or air handling conduit, allows measurement of the air of the entire home or building. This whole home or whole building homogenization allows a single sensor to effectively measure the IAQ of the entire structure or portion thereof. In some buildings and dwellings, particularly ones that are smaller in size, a single device may be used to assess the composition of the air in circulation, while in larger buildings each floor or zone within a floor one or multiple devices may be used. In an embodiment, the origin of pollution events can be determined without a plurality of deployed devices by utilizing out of band data. This may be data reported by building occupants or by tracking the occupant's location in the home or other structure. In some cases, pollution events may be mediated by the presence or actions of occupants in the home or building. By correlating the occupant's location to historical pollution data from any of the available AQM devices, the AQM or host control and management software layers, such as those implemented within a cloud, can infer the likely origin of events that the AQM device measures and records. In other deployments, multiple devices can be placed upstream and downstream of the filters or air sanitizers to take a differential measurement of the levels of all sensor values. This allows high resolution quantification of filter and air sanitizing equipment performance.

In an embodiment, a differential pressure measurement from onboard pressure sensors on two devices may be used to measure the loading and ageing of a filter to detect when the filter requires replacement. This occurs without user intervention and ensures that the air displacement through the HVAC system is sufficiently high to ensure good IAQ throughout the house or building.

In an embodiment, the loading of the filter may be detected through computationally derived volumetrically adjusted total particulate load tracking system. The flow corrected particle counts may be used to calculate the expected particulate load across the entire duct for a known duct cross section. This is then subtracted from an established model for the loading of the filter for a given filter medium and surface area. Once the available loading capacity is exhausted, the filter is considered depleted. In another embodiment, sensor fusion is used to ensure that the particulate loading filter life calculation is more reliable by tracking the decay of flow velocity and pressure as the filter ages. In particular, the pressure differential between blower states is instructive in measuring filter loading. The current pressure delta across a blower enable or disable event can be compared to historical data to identify filter end of life. This is complimentary as the system may have incorrect data on the filter medium, filter surface area, filter efficiency or there may be multiple filters or system leakages that change the rate of contaminant accretion.

In an embodiment, the device may be implemented as a long probe, this ensures that the boundary layers of turbulent or stagnant air at the walls of the ducts are avoided. The device may have multiple apertures to accommodate additional sensors without increasing the overall size of the device. Sensors that require a precise flow rate are paired with a flow sensor within the same aperture for real time flow correction.

In an embodiment the device may have a mounting fixture that enables the device to be affixed to a duct or air handling conduit. The mounting fixture may also facilitate the rapid insertion and removal of the probe from the duct. The duct may be metal, plastic, duct board or other material, or may be formed by other structural members such as walls or ceiling tiles. The duct may be rectangular or circular in shape and may be rigid or flexible. The mounting fixture ensures compatibility with all of the aforementioned types, shapes and materials of duct or air handling conduit. The mounting fixture may have multiple interfaces ensuring that the gaskets form a contiguous mating surface on both flat and curved surfaces. This ensures that leakages are minimized, and that installation of the device does not affect the efficiency of the HVAC system.

In an embodiment the mounting fixture has a channel that matches the outer profile of the probe enclosure, so that the probe can slide along the channel and be fully supported by it. The mounting fixture is fixed to the duct with fasteners such that the channel for the probe is level and parallel to the axis of air flow in the duct. In this way, when the probe is inserted into the mounting fixture, the air flow is aligned to the apertures. The mounting fixture may have multiple inside surfaces of different diameters to ensure compatibility with both flat and round duct surfaces. When the duct surface is round, there are one or more surfaces with each surface having a curvature radius matching a particular type or style of curved duct. The mounting fixture may use gasket materials to seal the interface between those surfaces and the duct. The mounting fixture may include features such as magnets, mechanical detents, optical markings, optical stops, optical reflectors or metallic components that allow the probe to detect that it has been installed in the channel of the mounting fixture. In this way, the probe can disable any components that need to not be active outside of the duct. The device may contain mechanical, optical or magnetic sensors to detect the presence and orientation of the features in the mounting fixture.

In an embodiment, a laser, used as part of an optical particle counter, may be disabled to ensure that the user is not exposed to stray light from the laser inadvertently prior to insertion of the powered device. Once the probe is installed, the device detects the presence of one of these features and enables the laser to be used by the OPC. The device enclosure may have one or more mechanical detents or apertures that interface with features in the mounting fixture, this allows the user to insert the device to the correct depth during installation.

As the sample air passes through the device, it passes one or more sensors. The device may sense at least one parameter and store the sensed parameter in either volatile or non-volatile memory. The device may then apply flow compensation to that value or simply record the flow rate at the time of the measurement for future flow correction or compensation. The device samples continuously, but may discard the data if there is no change in the measurement; this is one example of an optimization that the device may use to maximize the efficiency of onboard memory. Other implementations may use byte utilization encodings such as a Huffman code, compression algorithms, or dynamic data rates to increase the amount of data that can be cached onboard. The device may choose to alter its own sensor bandwidth as a function of the rate of change or deviation from the norm. In this way, useful data t may be captured at a higher bandwidth. The device may also continuously down sample the previously recorded data to ensure that it can keep recording new data when the memory is nearing full utilization.

The device can operate in a standalone fashion or it may connect to a remote computing system to clear its cache on a continuous basis. The device may have one or more communication systems onboard, including both wired and wireless standards for transmitting telemetry and for receiving commands and configuration data. The wired standard may be any one intended for transmission lines in an industrial environment, which may be differential wire level standards such as RS-422 or RS-485. The communications protocol that is implemented in the wired monitor is defined in the device software and can be Modbus, BACnet, LonTalk, or any other protocol scheme including proprietary ones. The wireless embodiment may utilize a transceiver and antenna that extends outside of the duct and may be implemented as Bluetooth, Bluetooth smart, Wi-Fi, Z-Wave, ZigBee or any other wireless protocol.

In an embodiment, the device may generate a control signal based on one or more air quality parameters. This signal may be transmitted over the wired network that it is connected to, via a direct wireless connection to the target device, via a hub that allows interfacing with devices with mismatched transceivers or via a cloud connection that is mediated by API layers of the two devices. The device may regulate the control signal to keep the sensed parameters within certain thresholds. This regulation may be a PID loop or other feedback loop, allowing the device to achieve a target value for any given parameter. The target devices may be any kind of controllable end-effector including bypass valves, automated vents, fan drivers, air circulators, automated windows, furnaces, air purifiers, heaters or other systems within the house or building. The control signal may be used by the target devices to regulate their own performance or the target devices may be directly actuated by the control signal. An example is an air purifier that has a variable speed drive. The control signal is thus a demand control loop that ensures that the air purifier is always running at a sufficient rate to keep the target parameters within the desirable range. In a similar fashion, any control system can be bound to the control signal through APIs. In an embodiment these APIs may be implemented as cloud to cloud APIs. The actuated device uses internal parameters or API defined settings to control the dynamic range and slew rate of the actuation, thus ensuring that the control signal does not overdrive the target device.

In an embodiment the he device can measure the rate of change that the HVAC system is capable of in either the firmware or cloud layers by measuring the rate of change relative to the control signal. These measurements may be used to derive the hysteresis of the HVAC system for each parameter, and in this way the device can regulate its control signal use without any prior knowledge of the HVAC system construction, size of the building, efficacy of actuated target devices or any other parameter not measured by the device. As the device operates in the duct environment, contamination slowly accumulates from particulates and other contaminants present in the air stream. The device may use smooth and straight air pathways to minimize the turbulence in the air stream and to avoid low pressure zones that induce settling out of suspended particulates or other contaminants. Furthermore, the plastics of the enclosure and apertures may be produced with materials and processes that yield a low surface energy, which greatly reduces the adhesion of particulates and other contaminants on those surfaces.

In an embodiment, the device enclosure may be composed of a material that is conductive or contains an additive that is conductive. In another embodiment, the enclosure material is not conductive, but is treated with a conductive coating, paint or spray to render it conductive. In some embodiments, the enclosure is in physical contact with exposed conductive contacts on the surface of the printed circuit board. These contacts are connected to the ground of the electrical system and ensure that any charge that accumulates in the enclosure is dissipated. In this way, particulates that may be positively or negatively charged are not electrostatically attracted to the device enclosure or components and this reduces the affinity of the interaction between the exposed surfaces and the particles or other contaminants. Thus, when the device is removed from the mounting fixture, it is easy to clean any contamination. The user simply blows into the apertures or may choose to use a source of moving air such as canned air, compressor, dusting blower or even a vacuum.

In an embodiment, the device may be used as an air quality monitor (AQM) and may be configured to sense one or more parameters relevant to a home or buildings indoor air quality (IAQ). The device may utilize sensor fusion to minimize the effects of sensor drift and other sources of error. For example, the device may be configured to monitor one or more parameters in the air stream with its array of sensors. In an embodiment, the optical particle counter sensor may measure the air velocity by statistical analysis of the transit times of particulates through the detector. The device would simultaneously take measurements with an acoustic or thermal flow sensor that may be implemented as a component on a wire harness suspended in the flow regime or as a component on the surface of the PCB with access to the flow regime. By way of tracking the agreement between these two measurements, over large numbers of samples, the drift in the thermal or acoustic sensor may be measured by the performance of the optical transit time measurement. This allows the stability of the optical flow measurement to be combined with the precision and repeatability of the thermal or acoustic flow sensor. In some embodiments, one or more parameters can be supplied by an external device or system. Thus, the device does not require any particular sensor, it can capture data from other devices in the HVAC system over a wired or wireless communications channel. In some embodiments, the device has both wired and wireless interfaces to maximize the interoperability with other devices in the HVAC system. It may then negotiate individually or via a hub with all of the devices in its local context.

Figure 1:
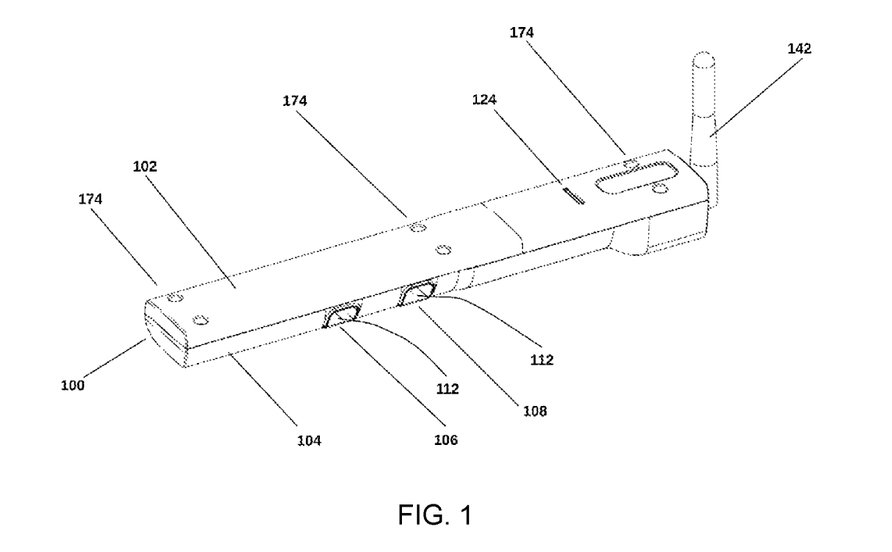
Figure 2:
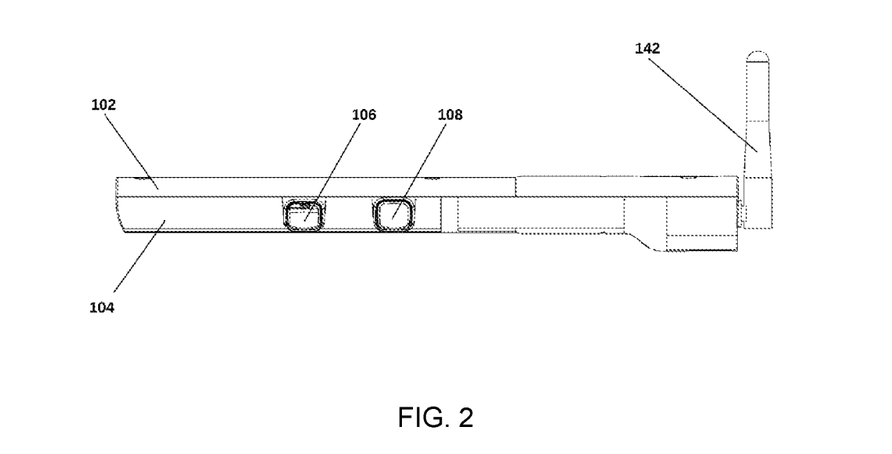

FIG. 1 illustrates a perspective view of a fully assembled AQM device according to some embodiments. FIG. 2 is a side view of the device of FIG. 1 according to some embodiments. Referring now to the figures, FIG. 1 and FIG. 2 are assembled views of the device 100 according to some embodiments with enclosure top 102 and enclosure bottom 104. The enclosure top 102 and bottom 104 may be connected via fasteners (not shown) inserted in screw holes 174. The screw holes 174 may have a depth such that the top of the fasteners (not shown) are below the surface of enclosure top 102. This reduces contact with the fasteners (not shown) by the user or installer and prevents conduction of electrostatic discharge events into the printed circuit board (not shown).

In some embodiments the device 100 may include an interconnect section to accommodate the wire to device interconnect, this section may house a terminal block (FIG. 3, 144) or other wire-to-board interconnect with two or more positions. The enclosure may have one or more air intake apertures or nozzles 106, 108 which allow intake of air from the air stream into the device 100. The shape of the apertures 106, 108 allows a low impedance and adjustable internal air velocity by the aspect ratio of the inner faces of the apertures 106, 108. In some embodiments, the device 100 may have an antenna 142 to increase the range of the wireless connectivity. In other embodiments of the device 100, an internal antenna populated on RF transceiver (FIG. 5, 138) or elsewhere on the printed circuit board (FIG. 5, 103) may be utilized. In some embodiments, the device 100 may be installed such that the bottom surfaces 112 of the air apertures 106 and 108 are oriented facing down towards gravity. Thus, sedimentation accumulates on the bottom surfaces 112 where it does not affect the sensors and where it may be readily cleaned by insertion of a cleaning instrument into apertures 106 and 108.

FIG. 2 is a side view of the device 100 of FIG. 1 according to some embodiments with enclosure top 102 and enclosure bottom 104. This view is illustrative to visualize how air intersects with the device and can traverse the apertures 106 and 108. In some embodiments the apertures 106, 108 may have a straight or curved cross section across the enclosure formed by 102 and 104. In other embodiments, the apertures 106 and 108 the aperture may have a nozzle cross section or other three-dimensional shapes to provide management of the air displacement across the sensor access apertures 110 or in order to adjust the detection volume formed by the intersection of the beam line (not shown) and airstream in the sampling apertures 106 and 108. The apertures 106 and 108 are positioned away from the mounting plate detent (FIG. 1, 124) so that they are distant from the walls of the duct or other conduit in which the device 100 resides when installed via the mounting plate (not shown). This ensures that the apertures 106 and 108 are not within the boundary regions proximal to the walls of the duct or conduit, where air may be stagnant, slow moving or turbulent. The antenna 142 may be of different styles and sizes or may not be present at all depending on the RF environment. In some embodiments, the antenna 142 is larger to have a higher gain and achieve a greater range. The enclosure bottom 104 may accommodate the mounting requirements of multiple different antennas 142.

Figure 3:
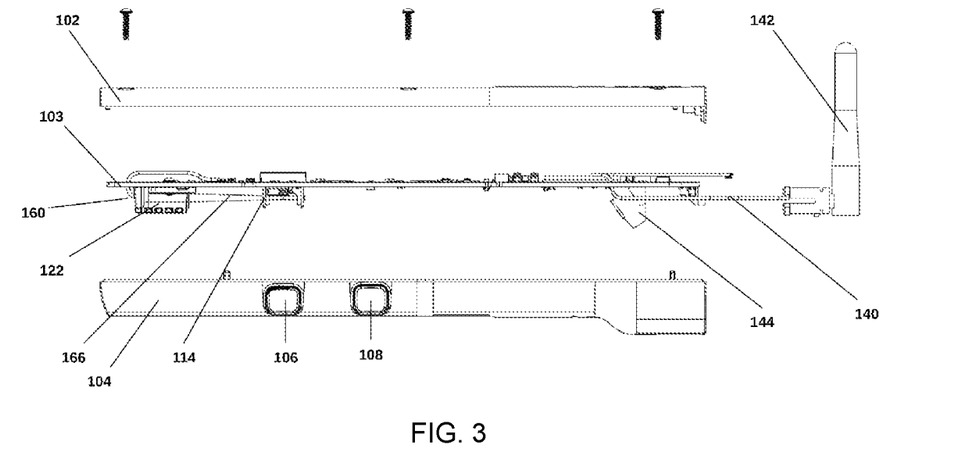

FIG. 3 is an exploded side view of the device 100 of FIG. 1 according to some embodiments. with enclosure top 102, the enclosure bottom 104, apertures 106, 108 and a printed circuit board 103 populated with electronic components. The terminal block 144 provides a connection to an external source of power. In some embodiments, the terminal block 144 may have additional positions to accommodate a plurality of data lines for wired telemetry transmission. Also shown are the laser mount 122, laser 160 and optical block 114 which provide the light source for the optical particle counting functionality. The laser mount 122 secures the laser 160 to the printed circuit board 103 and ensures that the beam line 166 is in alignment with the optical block 114. There may be a plurality of different optical blocks 114 to accommodate different lasers 160 that have beam lines 166 with different spot sizes or beam divergence angles. The antenna 142 is connected to the PCB 103 or components on the PCB via the cable 140.

Figure 4:
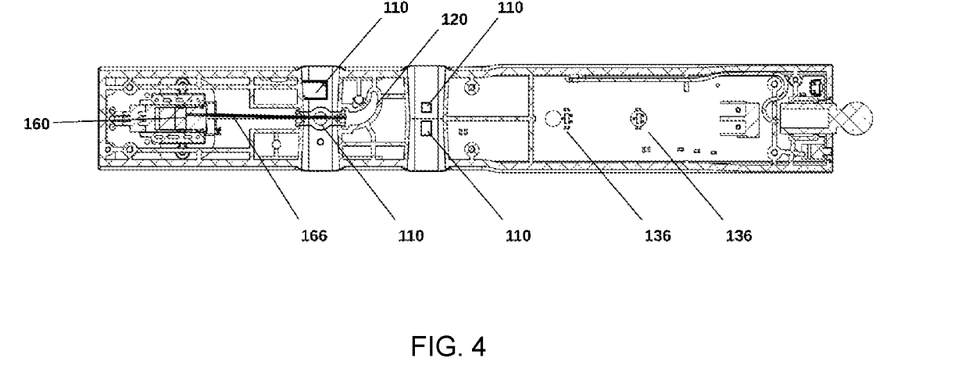

FIG. 4 is a cross sectional top view of the device 100 of FIG. 1 according to some embodiments. FIG. 4 shows how the laser 160 is mounted such that it transmits its beam line 166 over a sensor access hole 110 into the beam dump 120 which terminates the laser light. The sensor access hole 110 ensures that a minimum of stray light enters the photodiode or other sensor as aside from the hole 110, the photodiode or other sensor is completely protected by the enclosure top 102. In one embodiment, the PCB mounted optical, acoustic or thermal flow sensor 156 is in the same aperture 106 as the optical sensor assembled by the laser 160, access hole 110 and beam dump 120, in this way is can measure the exact flow or displacement as seen by the optical sensor. This allows the device to compensate for variability in the flow in the duct and through the apertures 106 and 108. The beam line 166 passes through the detector across sensor aperture 110 and terminates in a beam dump 120, thus light does not escape the device enclosure formed by enclosure top 102 and enclosure bottom 104. Sensors 136 may be mechanical, optical or magnetic sensors positioned to detect the presence and orientation of the mounting plate 273. There may be one or more sensors 136, to detect the position of the device 100 relative to the depth of insertion into the mounting plate 273

Figure 5:
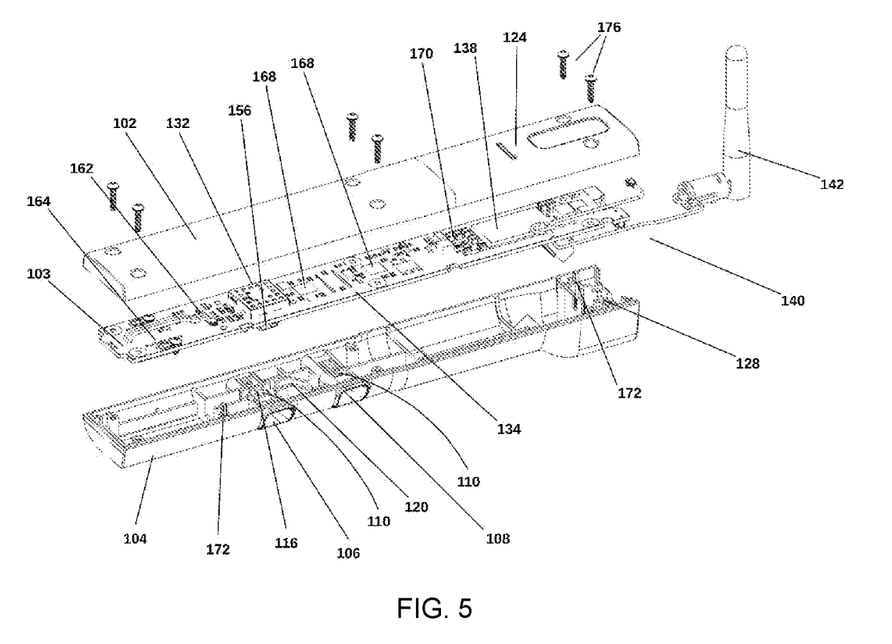
Figure 6:
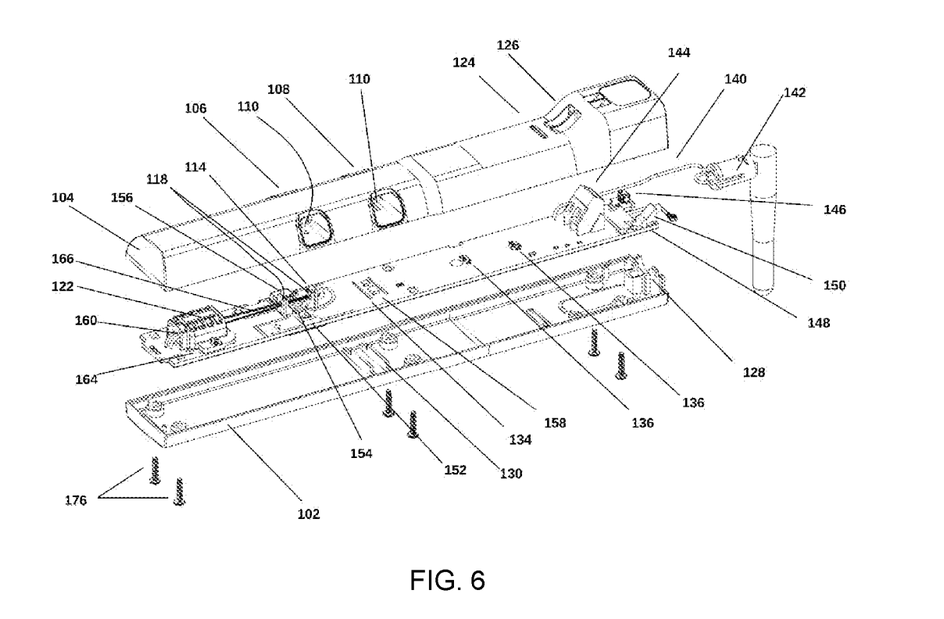

FIG. 5 is an exploded top perspective view of the device 100 of FIG. 1 according to some embodiments. In this embodiment, an RF transceiver 138 is mounted on the PCB 103 and subsequently connected to an antenna 142 via the antenna coaxial cable 140. The antenna 142 is mounted in the joint formed by the top enclosure 102 and bottom enclosure 104 in the antenna mounting feature 128. A power supply 170 for the device is mounted on the PCB 103 and provided with external power via the terminal block (FIG. 6, 144). One or more microcontrollers 168 are mounted on the PCB 103 to control the optical particle counting functionality in addition to all other control aspects of the board. The microcontroller 168 will also provide data access off board, in this embodiment, via interaction with the transceiver 138. In order to provide an extremely low noise environment for the analog front end of the device at the OPC detector on the reverse of the PCB 103 relative to the photodiode 154, shielded in provided on the PCB 103 by mounting an RF shield 132. The laser 160 is connected to the PCB 103 power via the laser interconnect pads 162. Thermal relief slots 134 are provided in the PCB 103 in order to reduce device 100 self-heating and to reduce heat transmission from one half of the board to the other. The bottom enclosure 104 has additional sensor access holes 110 through which different sensors mounted on the printed circuit board 103 can have access to air flowing through the second sampling aperture (see FIG. 1, 108). Throughout the bottom enclosure 104 piece, one or more locating pins 172 are used to register the PCB 103 so that the alignment of the PCB mounted sensors 154, 156, 158 and the bottom enclosure 104 is accomplished.

FIG. 6 is an exploded bottom perspective view of the device 100 of FIG. 1 according to some embodiments. The device may have an optical, thermal or acoustic flow sensor 156 used to determine if air is flowing through the aerosol sampling aperture 106. This sensor can accurately determine the flow through that particular aperture for sensors where the air flow velocity or mass displacement is critical. The enclosure contains a laser 160 that is retained mechanically with a laser mount 122; the clip and laser assembly can be secured to any of a plurality of holes in the PCB 103 which form an optical rail 164 to accommodate a range of laser 160 focal lengths. This allows the laser 160 to be substituted without forcing changes to the PCB 103 nor the enclosure 102, 104. The thermal relief slots 134 isolate the peripheral sensors 158 from the heat generated by the power supply 170, the transceiver 138 and the laser 160.

The PCB mounted flow sensor 156 is located directly beside the sensors in the same channel 106 and thus experiences the same velocity and mass displacement as the other sensors. The laser beam line 166 is constrained by the optical baffles 118 that are part of the optical block 114. The optical block 114 is mounted to the PCB 103 via holes in the PCB that constitute the optical block mating surface 116. A diagnostic LED 152 is used to selectively confirm the sensitivity of the photodiode 154 and can be used to give a baseline measurement for the photodiode 154 which can be used in the calibration of the device 100. In order to prevent escape of air into the enclosure 104, air leakage covers 130 are located as the sides of the airflow channel 108 to block air flow through the thermal relief slots 134. On the front of the PCB 103 are mounted a user accessible button 146 and an RGB led 148 that is visible on the outside of the enclosure 104 via a light pipe 150. Both the button 146 and the LED 148 are managed by a microcontroller 168. One or more interlock sensors 136 are mounted on the PCB 103, in one embodiment, the sensors are hall effect sensors and respond to an external magnet which in one embodiment is located in the magnet cavity (not shown) of the mounting plate (not shown). The bottom enclosure 104 has two wiring access holes 126 which match up with the PCB 103 mounted terminal block 144 to provide external power to the device 100.

Figure 7:
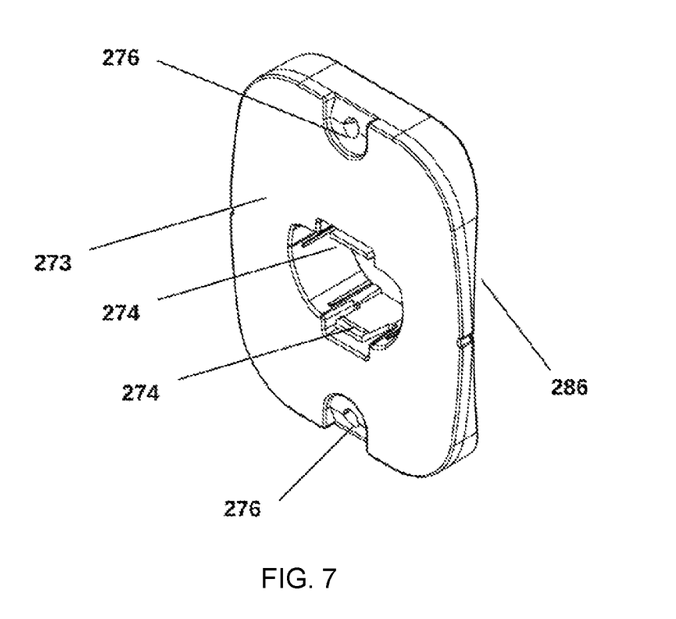
FIG. 7 is a front perspective view of a mounting fixture optionally used with the device of FIG. 1, according to some embodiments.

FIG. 7 is a front perspective view of a mounting fixture optionally used with the device of FIG. 1, according to some embodiments. In an embodiment the mounting fixture may be a mounting plate 273 with two or more screw access holes 276 for affixing the mounting plate to a duct using fasteners 290 (not shown). The mounting plate has a device channel that supports the probe when inserted. The probe is fixed in place during insertion via detente locking clips 274 that align with the detents (not shown) in the top enclosure (not shown) and bottom enclosure (not shown) of the device (not shown). The inside surface of the mounting plate 273 has rails with zero draft and one or more retention clips 274 that ensure that the device is well supported when installed in the mounting plate 273. This allows the device to be retained without shifting even under the influence of vibration or fast-moving air streams.

Figure 8:
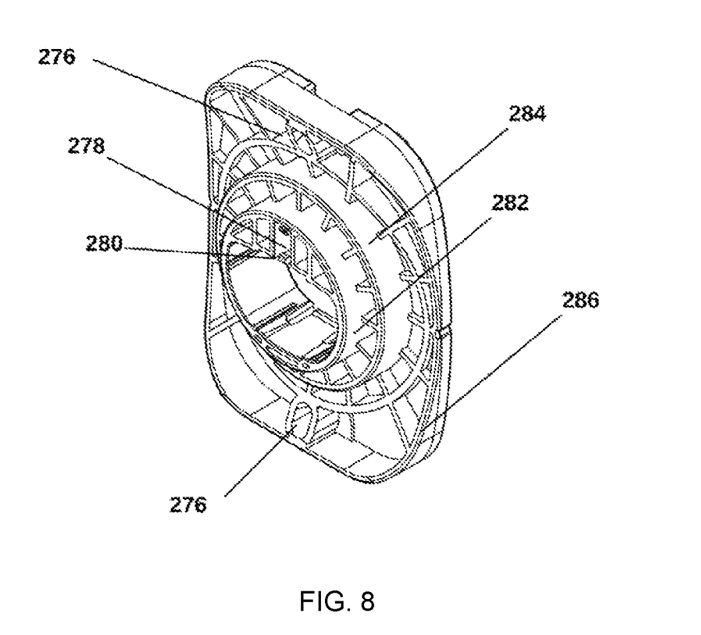
FIG. 8 is a rear perspective view of the mounting fixture of FIG. 7, according to some embodiments.

FIG. 8 is a rear perspective view of the mounting fixture of FIG. 7, according to some embodiments. The mounting plate 273 has two faces 282, 284 that press against the external wall of a duct or air handling conduit. If the installation duct is flat, the smaller interface 282 will be in contact with the duct, whereas if the duct is round, the larger interface 284 will be in contact with the duct. In the case of a large duct, the curved engagement edge 286 will make contact with the installation duct. The mounting plate 273 also contains a cavity 278 to hold a magnet or other detection target that is inserted into cavity 278 which will interact with the interlock sensors (not shown) when the device is installed in the mounting plate 273. The cavity 278 has an integral retention clip 280 which is used to keep the detection target captive within the cavity 278.

Figure 9:
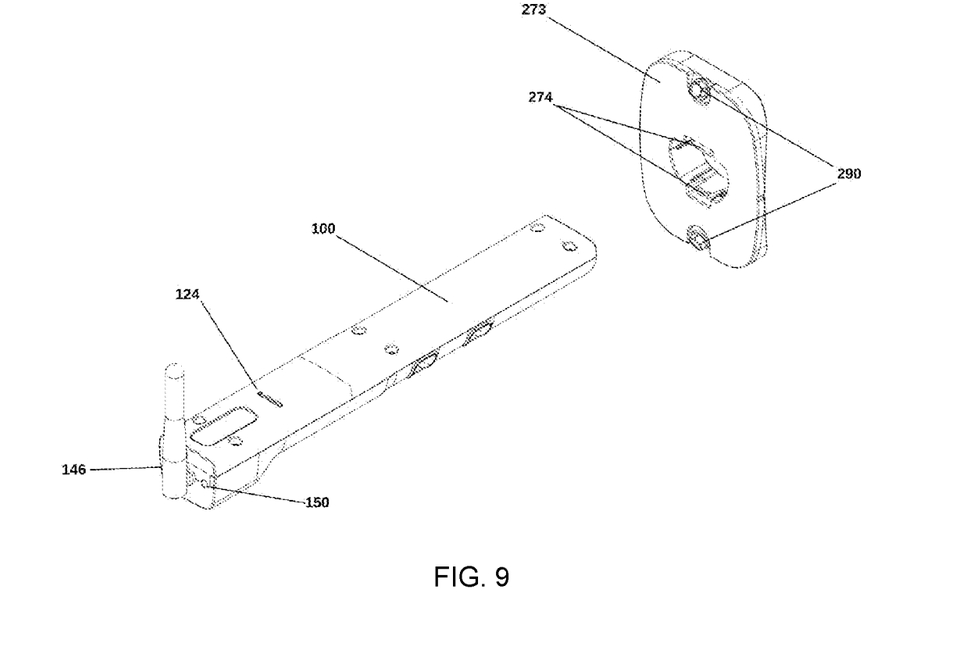
FIG. 9 is perspective view of the device of FIG. 1 and the mounting fixture of FIG. 7 in a pre-mated configuration, according to some embodiments.
Figure 10:
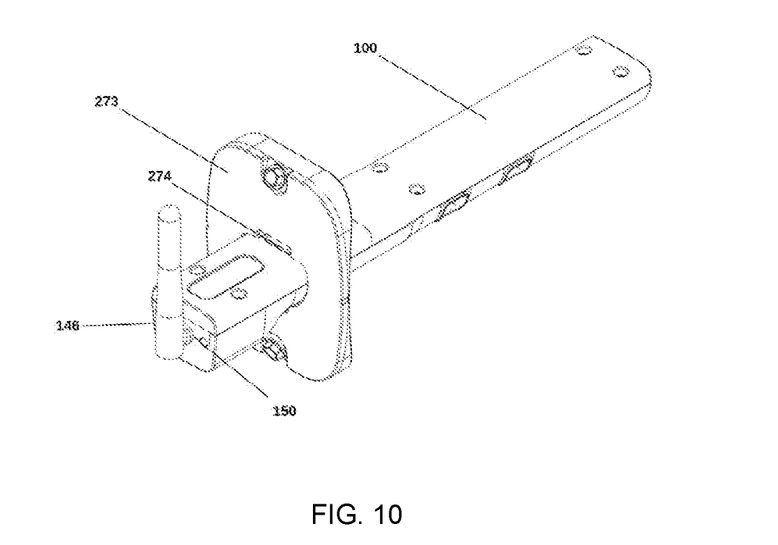
FIG. 10 is perspective view of the device of FIG. 1 and the mounting fixture of FIG. 7 in a post-mated configuration, according to some embodiments.

FIG. 9 and FIG. 10 are perspective views of the device of FIG. 1 and the mounting fixture of FIG. 7 in pre-mated and post-mated configurations respectively, according to some embodiments the mounting plate detent 124 is configured to mate with the detente locking clips 274 and secure the device 100. The seam at the joining of the two enclosure pieces 102, 104 has a hole in the front aspect of the enclosure bottom 104 which provides a light pipe 150 to display the light from a PCB (not shown) mounted RGB LED (not shown) out the front of the device. A second hole in the seam between the enclosures provides access to a button 146 which can be used to interact with the PCB mounted microcontroller. The mounting plate 273 is secured to the duct or air handling conduit by the fasteners 290. The fasteners 290 may be magnets, screws, toggle bolts or other means.

Referring to FIG. 10, the mounting plate 273 may be attached to a duct using fasteners 290. The mounting plate 273 is inserted into a hole in the duct of a diameter to accommodate either the inner duct interface 282 or the outer duct interface 284. The device 100 can be removed quickly and easily from the mounting plate 273 by pulling sufficiently hard to disengage the detent locking clips 274. The device 100 may be removed from the mounting plate 273 for servicing. Once servicing is completed, it is reinserted by sliding the device 100 into the channel of the mounting plate 273. The device 100 may be inserted to any depth or returned to its full depth by allowing the retention clip 274 to engage with the mounting plate detent 124.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification.

The invention claimed is:

1. An air quality monitor apparatus comprising:
   at least one air exchange port having an air inlet aperture and an air outlet opening, the at least one air exchange port creating an at least one air stream pathway within an interior of the apparatus, extending between the air inlet aperture to the air outlet opening:
   at least one optical system, the at least one optical system providing light across the air stream pathway;
   at least one microcontroller configured to process the measured air quality data; and
   a plurality of sensors having access to the air stream pathway, the plurality of sensors configured to measure air quality data;
   at least one communication system configured to communicate the processed air quality data with an outside network; and
   a power supply apparatus providing power to the apparatus,
   wherein the plurality of sensors further comprises at least one of optical, acoustic or thermal flow sensors, mounted onto the at least one microcontroller, and
   wherein one of the at least one of optical, acoustic or thermal flow sensor is positioned in the air inlet aperture.

2. The apparatus of claim 1,
   wherein the apparatus has at least two air exchange ports creating at least two air stream pathways, each of the at least two air exchange ports having an inlet aperture and outlet opening,
   wherein the at least one optical system providing light across at least one of the at least two air stream pathways; and
   wherein the plurality of sensors has access to each of the at least two air stream pathways and are configured to measure air quality data from each of the at least two air streams.

3. The apparatus of claim 2, wherein the each of the at least two air exchange ports are symmetrical, have high internal surface finish quality and have the necessary geometry to ensure smooth laminar flow across the plurality of sensors at all operating velocities present in the ducted system.

4. The apparatus of claim 1, wherein the air exchange port has a high internal surface finish quality and have the necessary geometry to ensure smooth laminar flow across the plurality of sensors at all operating velocities present in the ducted system.

5. The apparatus of claim 1,
   wherein the at least one air exchange ports creates at least two air stream pathways,
   wherein the at least one optical system providing light across at least one of the at least two air stream pathways; and
   wherein the plurality of sensors has access to each of the at least two air stream pathways and are configured to measure air quality data from each of the at least two air streams.

6. The apparatus of claim 1, wherein the at least one communication system is configured to connect to a cloud computing system.

7. The apparatus of claim 1, wherein the at least one communication system is configured to receive and transmit data over a wired or wireless connection.

8. The apparatus of claim 1, wherein the at least one communication system is configured to transmit a control signal to an HVAC device over a wired or wireless connection.

9. The apparatus of claim 1, wherein the at least one communication system comprises an exterior antenna.

10. The apparatus of claim 1, wherein the at least one communication system comprises an onboard radio transceiver with integrated antenna.

11. The apparatus of claim 1,
    wherein the at least one communication system is configured to receive input out-of-band data, and
    wherein the at least one microcontroller is configured to process the received input out-of-band data in combination with the measured air quality data.

12. The apparatus of claim 1, wherein the at least one optical system comprises a laser assembly.

13. The apparatus of claim 1, wherein power is supplied to the power apparatus over a wired connection.

14. The apparatus of claim 1, wherein the flow sensor comprises a bidirectional flow sensor.

15. The apparatus of claim 1, further comprising a mounting fixture that enabled the apparatus to be mounted to a wall of a ducted system or air handling conduit, wherein the air exchange channel is located between the wall and the center of ducted system or the air handling conduit.

16. The apparatus of claim 15, further comprising a sensor for determining the presence, orientation and location of the mounting fixture's location with respect to the apparatus.

17. The apparatus of claim 1, further comprising a mounting fixture that is configured to rotate along an axis of rotation that is perpendicular to the airflow path.

18. The apparatus of claim 1, wherein the at least one air stream pathway comprises a narrowed midsection.

19. A method of monitoring the status of an air filter using the apparatus of claim 1.

* * * * *